Patented Feb. 23, 1937

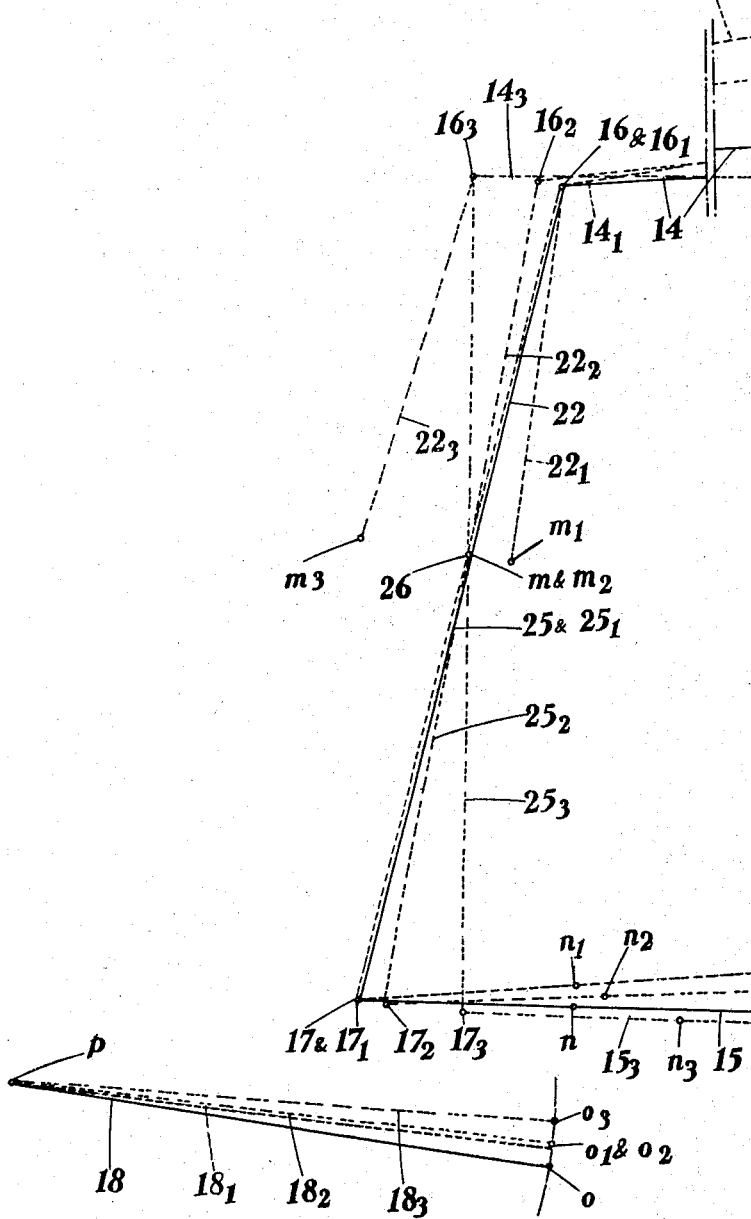

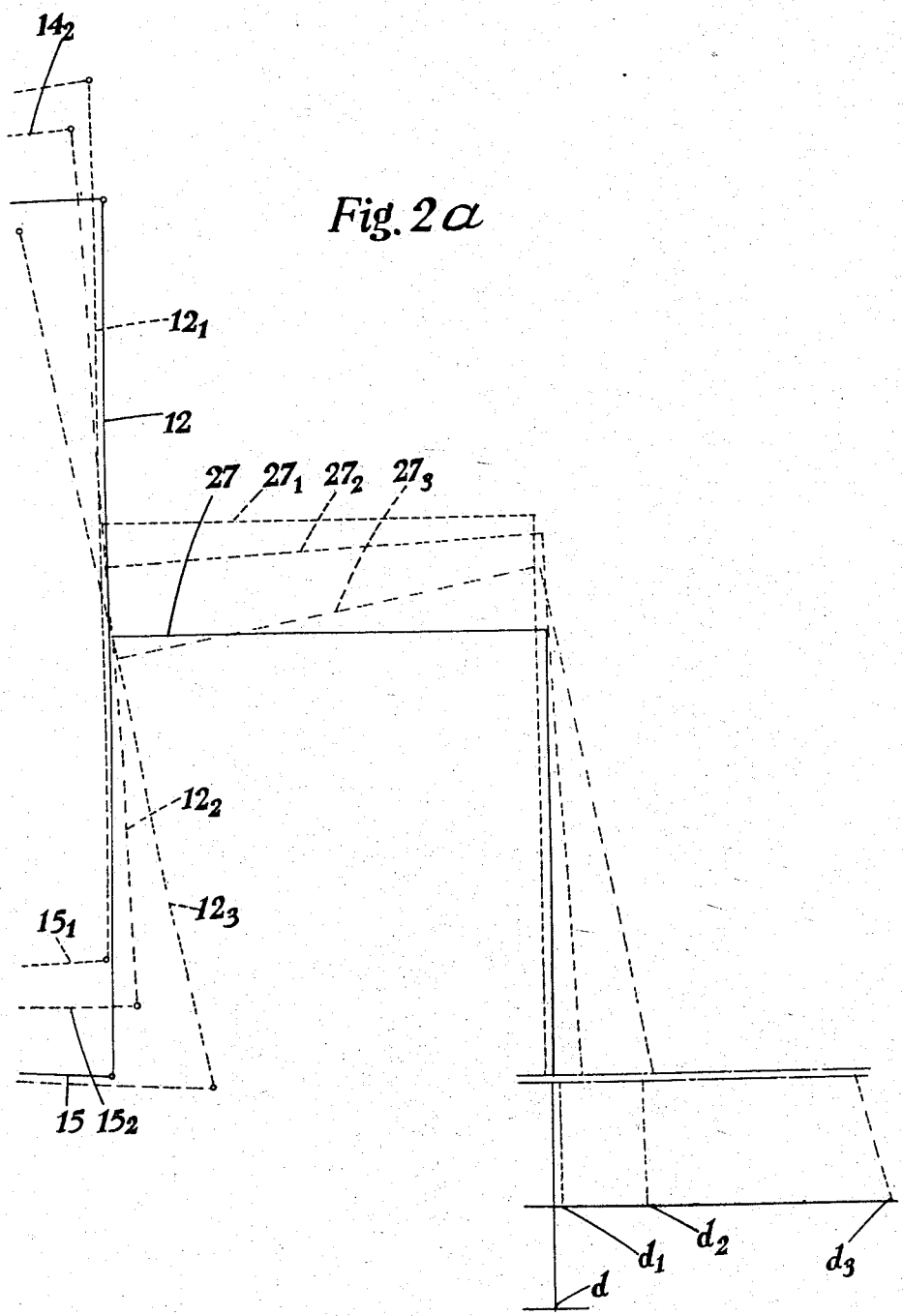

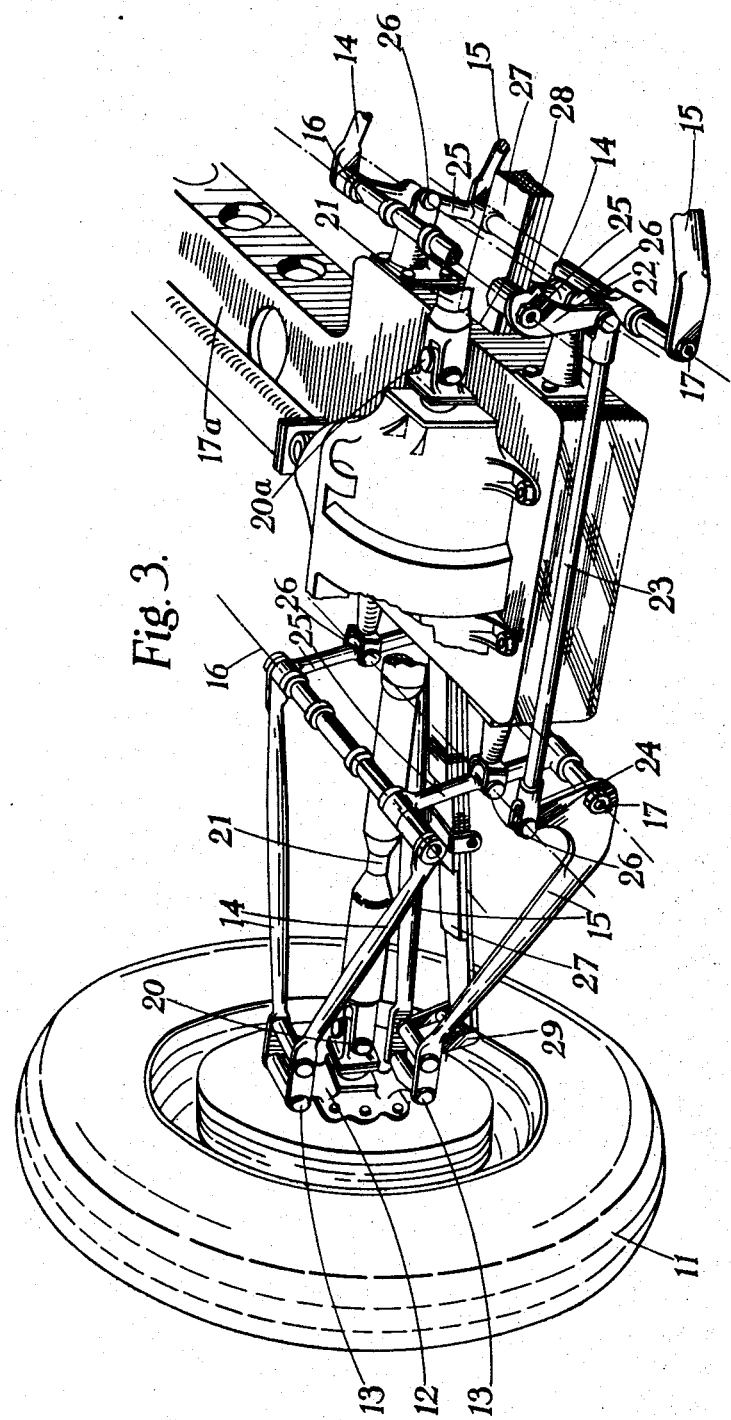

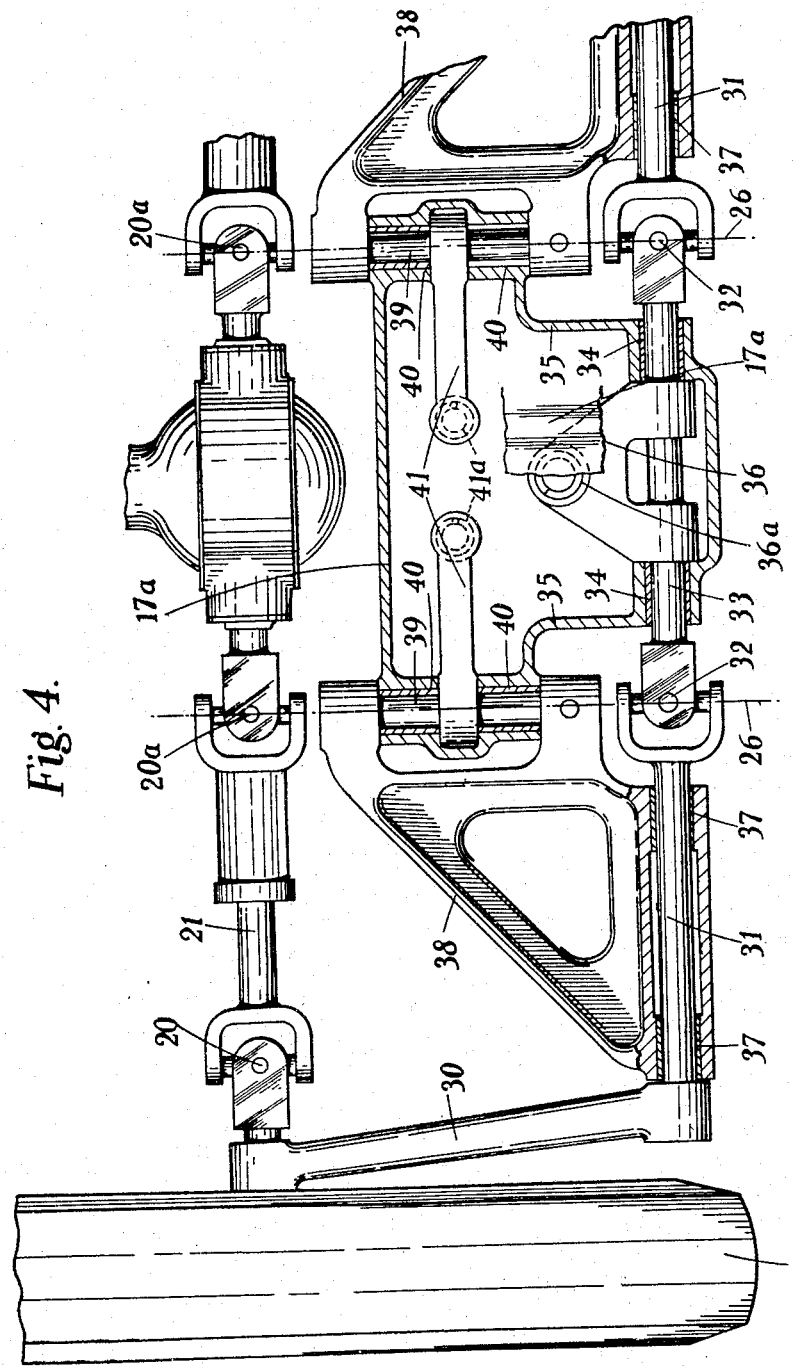

2,071,577

UNITED STATES PATENT OFFICE 2,071,577

SUSPENSION OF ROAD VEHICLES

William Somerville Renwick and Albert Sydney Enever, Abingdon-on-Thames, England, assignors to The M. G. Car Company Limited, Abingdon-on-Thames, England Application May 15, 1936, Serial No. 79,964, In Great Britain November 25, 1935

3 Claims. (Cl. 267—19)

This invention relates to the suspension systems of road-vehicles, and particularly to the suspension between the non-steerable road-wheels and the frame of a motor-vehicle body or chassis.

Our main object is to provide an improved suspension system which will be at the same time economical of tires during normal pitching movements of the chassis on its springs on a straight road and inherently resistant to rolling of the vehicle during cornering.

It is well known that many simple independent suspension systems having only one mode of wheel movement can be designed which will have no, or practically no, lateral tire scrub—provided that they have negligible inherent resistance to rolling. Well known examples of such systems are the Iancia and the Doubonnet, where the wheel is maintained in substantially the same plane relatively to the chassis frame during its up-and-down movements. It is also well known that simple independent suspension systems can be designed which have a high inherent resistance to rolling, provided that their normal mode of movement entails a considerable amount of lateral tire scrub, the wheel tilting relatively to the chassis-frame in the course of its up-and-down movements.

The present invention couples together negligible lateral tire scrub at times when roll resistance is not necessary and great roll resistance at times when lateral tire scrub is of minor importance.

According to the main feature of the invention, a pair of road wheels on opposite sides have their hub-assemblies so connected to the chassis-frame and with each other that they may rise and fall with substantially no lateral tire scrub provided that they rise and fall simultaneously by substantially equal amounts. (This method of rise and fall, relative to the chassis-frame of the vehicle, is that which obtains in all ordinary "pitching" of the vehicle on a straight road, and is also a component to a greater or less extent of most other movements of the wheels relative to the chassis-frame. It is therefore, the most important movement of the wheels relative to the chassis-frame. It is hereinafter referred to as the first mode of wheel movement.) Furthermore, either of the said road wheels can escape from this first mode of wheel movement when inequalities of the road surface make it desirable that one wheel should rise or fall independently of or more than the other relatively to the chassis-frame, and in this case the point of contact between the tire and road must move away from the center line of the chassis as the wheel rises, and towards the center line of the chassis as the wheel falls, and this mode of wheel movement producing lateral tire scrub is inherently resistant to rolling forces. It is hereinafter referred to as the second mode of wheel movement.

In a preferred method of carrying out the invention, the road-wheels are independently connected to the chassis-frame, and the independent systems for the two wheels are connected to one another, in such manner as to provide the two said modes of wheel movements. The second mode of wheel movement is effected about a predetermined axis, for each wheel, which is longitudinal of the chassis-frame. The first mode of wheel movement may be effected by means of the well-known parallel linkage or trapezium-layout mechanism, or, alternatively, it may take place about a transverse axis. While the first mode of wheel movement occurs the means interconnecting the two independent systems moves, but such means is stationary while the second mode of wheel movement occurs.

In the accompanying drawings:—

Figure 2 is a diagrammatic elevation, to a larger scale, of the right-hand suspension, indicating the positions of the different elements according to the different modes of movement, the parts of the elements between the chain lines being omitted for the sake of convenience;

Figure 3 is a fragmentary view corresponding to Figure 1 but illustrating a slight modification;

Figure 4 is a diagrammatic part-sectional plan view of an entirely different form of suspension embodying the principles of the invention.

Like numerals indicate like parts throughout the drawings as far as possible.

Figure 1:
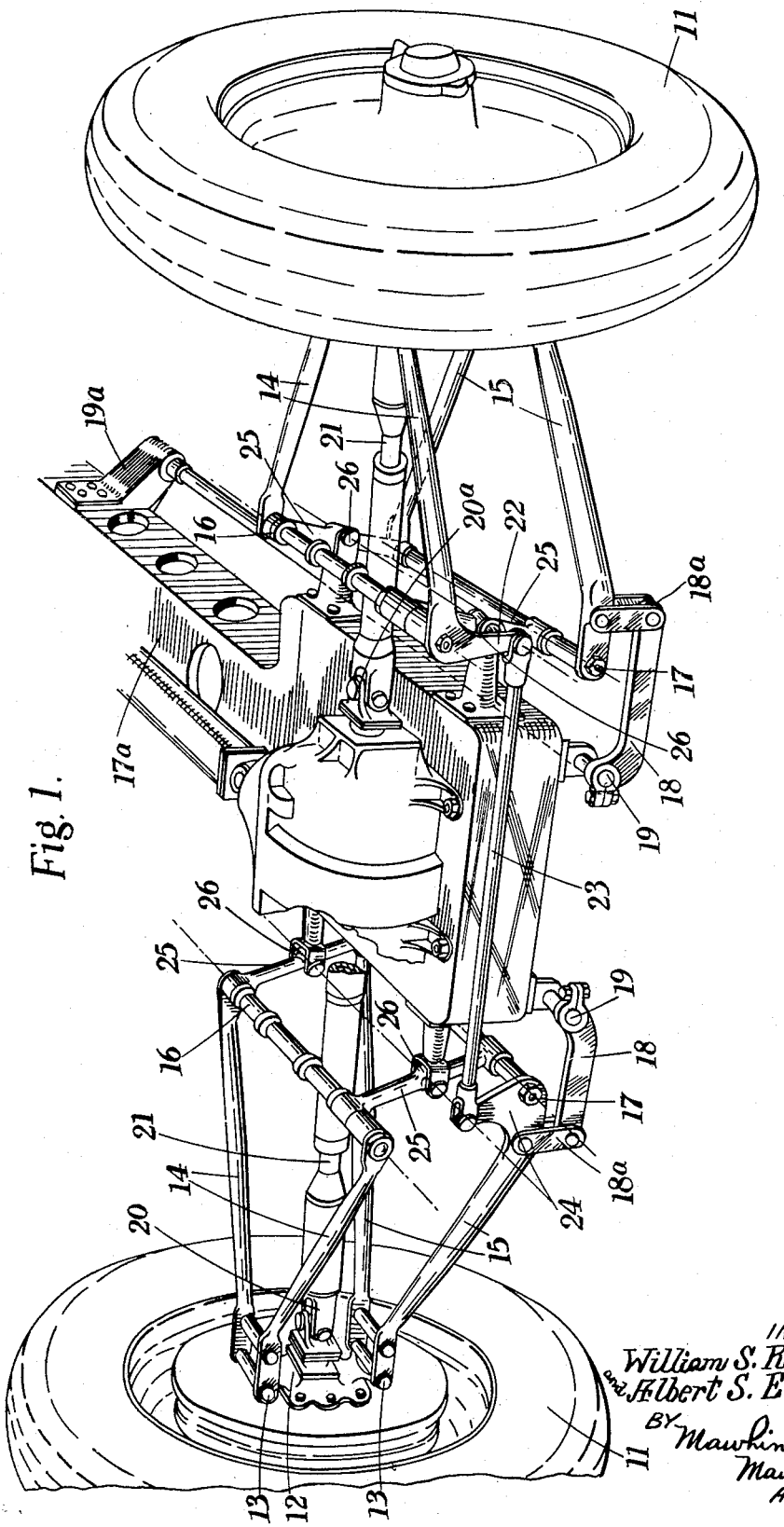
Figure 1 is a perspective view of the driven road-wheels of a motor-vehicle chassis of which the frame is suspended according to the invention.

When applying the invention to the driven road-wheels 11, 11 of a motor-vehicle, as illustrated by Figures 1 and 3, these are preferably doubly linked substantially in the manner described in the specification accompanying U. S. A. application No. 57,034, i. e., so that the lower parts of the wheels will rise or fall in substantially parallel planes and the wheels will thus move with substantially no lateral tire scrub between the wheel tires and the road when both wheels are simultaneously rising or falling similar amounts. It is not essential that the upper and lower links should be parallel, and equal in length, to the propeller shaft, as shown in Figure 1 of the drawings of that said specification: they may alternatively form a trapezium layout, as shown in Figure 2 thereof.

In the arrangement of Figure 1 hereof the wheel brackets 12 of the hub-assemblies are hinged at 13, 13 to the outer ends of upper and lower wishbone links 14, 15 pivotally mounted for movement about axes 16, 17, respectively, which are motionless relatively to the chassis-frame 17a when the latter is rising or falling vertically between level wheels, i. e., during the first mode of wheel movement. The lower links are shackled as shown at 18a to the arms 18, 18 fast on the torsion bars 19, 19 the remote ends of which are rigidly held to the chassis-frame 17a, as indicated at 19a. 20, 20a represent universal joints for the ends of each propeller shaft 21, as described in the specification above referred to, the outer joints 20 being constrained to swing in substantially true arcs about the centers of the inner joints 20a during the first mode of wheel movement.

In the present instance, however, the linkage systems of the two roads wheels 11, 11 are cross connected. Thus, the upper link 14 of the right-hand road wheel is formed with a downwardly-extending crank arm 22 connected by the transverse bar 23 to an upwardly-extending crank arm 24 formed on the bottom link 15 of the other road wheel, and the ratio of the length of the arm 22 to the length of the link 14 equals the ratio of the length of the arm 24 to the length of the link 15, such that simultaneous similar rises of the wheels 11 relatively to the chassis-frame 17a (according to the first mode of wheel movement) shift the bar 23 to the right, whilst simultaneous similar falls will shift the bar 23 to the left (also according to the first mode of wheel movement). If the pivotal axes 16, 17 of the links on the chassis-frame were permanently fixed, independent movement of the wheels 11 would be prevented. These axes are not fixed, however, but are formed in rocking levers 25, 25 pivotally mounted at 26 upon the chassis-frame 17a. It is preferable, though not essential, that the pivotal axes 26 and the pivotal axes of the ends of the bar 24 should be collinear, when the chassis-frame is normally loaded, as is actually illustrated in the perspective view of Figure 1. In these conditions independent rise or fall of one wheel 11 relatively to the chassis-frame 17a causes a rocking of the associated rocking lever 25 about the longitudinal axis 26 and introduces lateral tire scrub, this movement being the second mode of movement which, as is well known, is highly resistant to the forces which tend to produce rolling.

The positions of the various members during the different modes of wheel movement will be easily understood from a reference to Figure 2, where the full lines represent the positions of the members when the motor-vehicle is in the normally-loaded position. $d$ represents the point of contact of the wheel 11 with the ground, 27 the wheel axis, 12 the wheel bracket, 14 and 15 the upper and lower links, 16 and 17 their inner pivotal axes, respectively, 26 the pivotal axis of the rocking lever 25, $m$ the pivotal axis of the crank arm 22 with the transverse bar 23, $n$, $o$ the pivots of the shackle 18a, 18 the crank arm, and $p$ the axis of the torsion bar 19. The same letters and numerals followed by the suffix 1 refer to the same parts when the wheel 11 has risen, say, 2.5 centimeters according to the first mode of wheel movement, the positions of the members in this case being also indicated by single-dot lines. Those letters and numerals with the suffix 2 refer to the same members when the wheel 11 has risen the same distance according to the second mode of wheel movement, the positions of the members in this case being indicated by double-dot lines. Substantially the same stress is applied to the torsion spring 19 by both the first and second modes of wheel movement, it should be noted.

Those letters and numbers with the suffix 3 refer to the same members under unwanted movements according to a third mode of wheel movement, their positions then being indicated by the treble-dot lines, as when, for example, a wheel 11 meets a laterally-inclined surface, the bottom of the wheel being momentarily forced outwardly. It will be observed that, in the case of this third mode of wheel movement, a greater twist has been applied to the torsion spring 19, meaning that these unwanted movements are being resisted to a greater extent than the other movements, and the wheel 11 will be restored to its usual vertical position as soon as the applied side thrust is removed. This third mode of wheel movement must apply to both wheels 11 simultaneously—i. e., the bottoms of both wheels 11 will be forced out, or in, together.

In the modification shown by Figure 3 the spring associated with each wheel is a laminated leaf spring 27 the root of which is rigidly carried by the chassis frame 17a, as indicated at 28, and the free end of which is connected by a shackle 29 with one of the wishbones, the lower one 15 being thus illustrated. One advantage of this modification is that it is possible in some cases by appropriate arrangement of the angle between the wishbone 15 and the shackle 29 to resist the third mode of wheel movement referred to above.

In the arrangement shown by Figure 4 each of the road-wheels 11 is supported by a horizontal forwardly-extending arm 30 fast on a torsionally-rigid shaft portion 31, these shaft portions being connected by universal joints 32, 32 with a torsionally-rigid shaft 33 journalled at 34, 34 in what is shown as a suspension box 35, this being rigid with the chassis-frame 17a of which it forms a part. Fast on the shaft 34 is an arm 36 the upper face of which engages a coil spring 36a interposed below a bracket or other part rigid with the chassis-frame. This spring resists the movement of the wheels 11 relatively to the chassis-frame according to the first mode of wheel movement whilst the shaft 33 is turning about a transverse axis in the journal bearings 34.

In each case, however, the shaft portion 31 is also journalled at 37, 37 in the swinging bracket 38 fast on the shaft 39 journalled at 40, 40 for movement about a longitudinal axis 26 in the spring box 35. Fast on the shaft 39 is the arm 41 the underface of which engages a coil spring 41a. Movement of either road-wheel 11 according to the second mode of wheel movement takes place against the spring 41a beneath the associated arm 41 whilst the shaft 39 is turning about the longitudinal axis 26. The center of the universal joint 32 is collinear with the axis of the shaft 39. The center of the inner universal joint 20 may also be collinear therewith though this is not essential.

Figure 5:
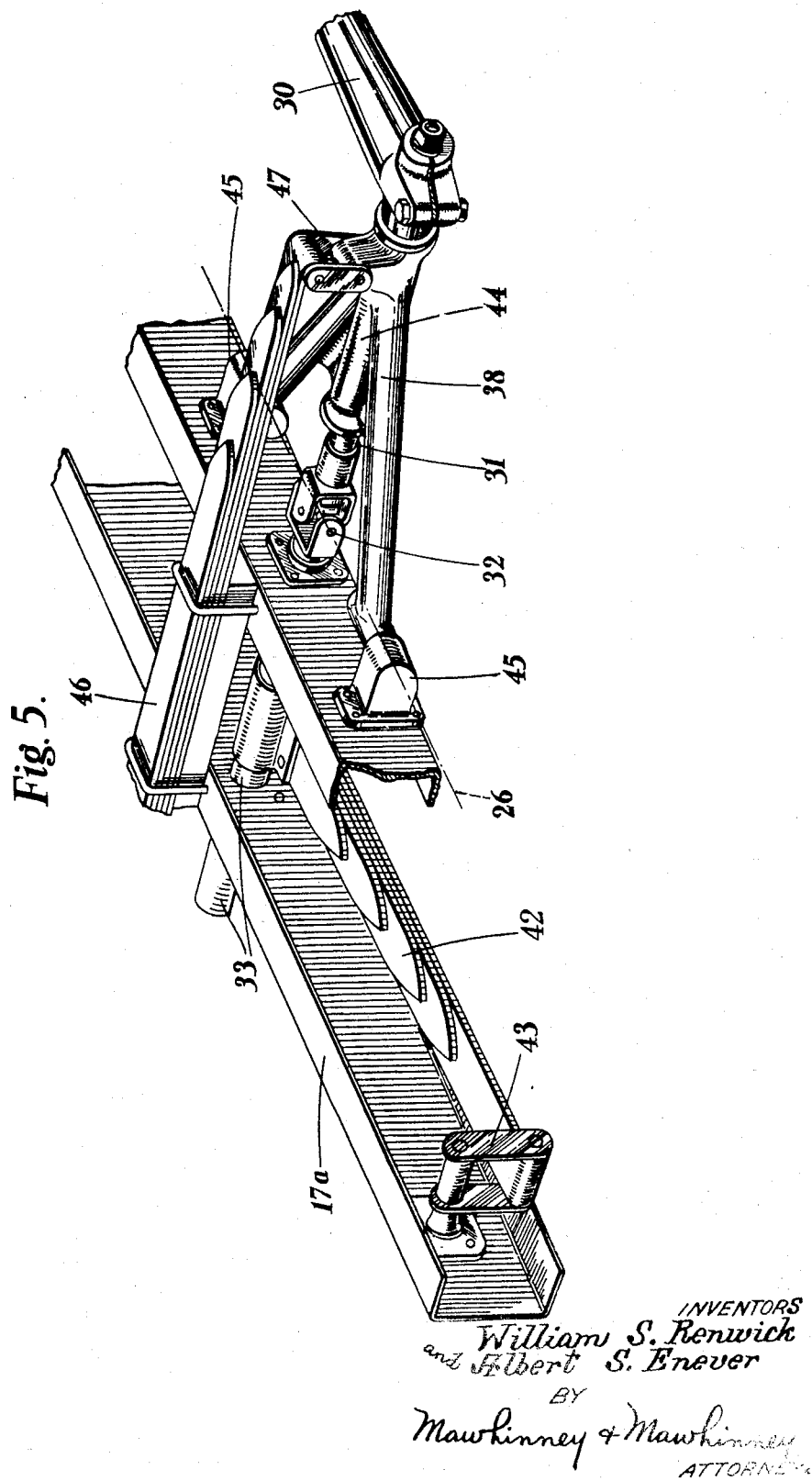
Figure 5 is a diagrammatic fragmentary perspective view showing a modified form of the suspension of Figure 4.

The modification shown by Figure 5 differs mainly in that the coil springs 36a, 41a of Figure 4 are replaced by leaf springs. Thus, in this case the common shaft 33 is fast with the end of the longitudinally-extending leaf spring 42 having its free end shackled at 43 on the chassis-frame 17a, this spring being flexed when the first mode of wheel movement occurs. The swinging bracket 38, which in this case is shown as a wishbone with a central limb 44 providing the journal bearings 37 for the associated shaft portion 31, is hinged at 45, 45 on the chassis-frame 17a for movement about the longitudinal axis 26 according to the second mode of wheel movement, the spring in this case being the adjacent end of the common leaf spring 46 connected by the shackle 47 with the outer end of the swinging bracket 38.

Thus, in all the above constructions we provide for different modes of wheel movement, one in which lateral tire scrub is negligible and another where there is material lateral tire scrub but which is inherently resistant to rolling. In this way substantially no lateral tire scrub occurs during normal operation, and rolling during cornering is inherently resisted.

What we claim as our invention and desire to secure by Letters Patent of the United States is:—

1. A road-vehicle having a chassis-frame and road-wheels on opposite sides thereof, suspension means independently connecting the chassis-frame to the hub-assemblies of the road-wheels, each of said suspension means including a rocking lever mounted on the chassis-frame and upper and lower links interconnecting the rocking lever and the associated hub-assembly, and means cross-connecting a link of one of said suspension means with a link of the other such that the rocking levers provide stationary pivotal axes for the links when both wheels rise or fall together substantially equal amounts relatively to the chassis-frame, and such that either of the rocking levers can turn about its mounting when the associated wheel rises or falls independently of or more than the other relatively to the chassis-frame.

2. A road-vehicle having a chassis-frame and road-wheels on opposite sides thereof, suspension means independently connecting the chassis-frame to the hub-assemblies of the road-wheels, each of said suspension means including a lever mounted for rocking on the chassis-frame about a longitudinal axis and upper and lower links interconnecting the rocking lever and the associated hub-assembly, and means cross-connecting a link of one of said suspension means with a link of the other; such that the rocking levers provide substantially stationary pivotal axes for the links when both wheels rise or fall together substantially equal amounts relatively to the chassis-frame, such movements occurring with substantially no lateral tire scrub, while said cross-connecting means moves, and such that either of the rocking levers can turn about its mounting when the associated wheel rises or falls independently of or more than the other relatively to the chassis-frame, such movement being one which introduces lateral tire scrub but which is inherently resistant to rolling forces, while said cross-connecting means remains stationary.

3. A road-vehicle having a chassis-frame and road-wheels on opposite sides thereof, and independent suspension means connecting the chassis-frame to the hub-assemblies of the road-wheels, each of said suspension means including a rocking lever mounted on the chassis-frame and upper and lower links interconnecting the rocking lever and the associated hub-assembly, one of the links associated with one wheel having a downwardly-extending arm and one of the links associated with the other wheel having an upwardly-extending arm, and an inextensible rod interconnecting said arms; such that the rocking levers provide stationary pivotal axes for the links when both wheels rise or fall together substantially equal amounts relatively to the chassis-frame, such movement occurring with substantially no lateral tire scrub, and such that either of the rocking levers can turn about its mounting when the associated wheel rises or falls independently of or more than the other relatively to the chassis frame, such movement being one which introduces lateral tire scrub but which is inherently resistant to rolling forces.

WILLIAM SOMERVILLE RENWICK.
ALBERT SYDNEY ENEVER.